USOO8562043B2

(12) United States Patent
Raulf et al.

(10) Patent No.: US 8,562,043 B2
(45) Date of Patent: Oct. 22, 2013

(54) ALIGNMENT DEVICES (75) Inventors: Robert Raulf, Lippstadt (DE); Hartmut Fabiunke, Bloomfield, MI (US); Daniel Földi, Levic (SK)

(73) Assignee: HBPO GmbH (DE)

( * ) Notice: Subject to any disclaimer, the term of this patent is extended or adjusted under 35 U.S.C. 154(b) by 0 days.

(21) Appl. No.: 13/268,121

(22) Filed: Oct. 7, 2011

(65) Prior Publication Data
US 2012/0086237 A1 Apr. 12, 2012

(30) Foreign Application Priority Data

Oct. 9, 2010 (DE) .......................... 10 2010 048 029

(51) Int. Cl.
*B60J 7/00* (2006.01)
(52) U.S. Cl.
USPC ....................... 293/132; 293/133; 296/187.09
(58) Field of Classification Search
USPC ............................... 293/132, 133; 296/187.09
See application file for complete search history.

(56) References Cited

U.S. PATENT DOCUMENTS 6,050,624 A * 4/2000 Kim .............................. 293/132

* cited by examiner

*Primary Examiner* — Joseph Pape
(74) *Attorney, Agent, or Firm* — Bourque and Associates, PA (57) ABSTRACT An alignment device for attachment to a mounting support for vehicle front ends, whereby the alignment device is configured to receive a crash box that connects the mounting support to a bumper bracket. The alignment device includes a first abutment element and a second abutment element between which the crash box can be inserted and which are provided upon receiving the crash box to rest on opposite sides of the crash box. At least one abutment element is designed such that when receiving the crash box, it presses the same against the other abutment element, whereby one or more holding devices are provided on at least one of the first or second abutment elements that serve to limit the insertion of the crash box into the alignment device.

18 Claims, 7 Drawing Sheets

ALIGNMENT DEVICES

TECHNICAL FIELD

The invention relates to an alignment device for attachment to a mounting support for vehicle front ends.

BACKGROUND INFORMATION

The situation to be considered here concerns the installation of vehicle front ends, which are connected via a so-called mounting support to the vehicle structure or frame. For this purpose, bumper brackets are usually attached to a mounting support via crash boxes, the mounting support itself is connected to longitudinal beams of the vehicle either directly or via the crash boxes.

The components used for the assembly are by nature subject to tolerances, such that their correct positioning must be ensured. In the case considered here, the crash boxes connected to the bumper brackets are received by the mounting support and screwed together and to the respective longitudinal beam by connecting bolts that are oriented in the transverse direction of the vehicle. Corresponding connector systems are known from DE 10 2008 012623 A1 or DE 10 2009 021 885 A1 or U.S. Pat. No. 7,503,603 B2. Because the components are subject to tolerances, the crash boxes may become misaligned both in the longitudinal direction X and the transverse direction Y of the vehicle as well as in the vertical direction Z when said crash boxes are placed into the mounting support; a defined placement and alignment of the components is therefore not possible. In U.S. Pat. No. 7,503,603, an adapter into which the crash box is inserted is used for tolerance compensation. In DE 10 2005 051 764 B4, the tolerance compensation between the crash box and the longitudinal beams of the vehicle is established via a screw thread. DE 10 2009 021 885 A1 proposes to insert the crash box into a receptacle on the mounting support, which defines the crash box in the vertical direction of the vehicle, in order to still allow for movements in the relative position of the crash box and the mounting support in the direction perpendicular to the driving direction and in the driving direction.

With respective devices from the prior art, it is until now not possible to reference the position between the components to be connected during pre-assembly.

SUMMARY OF THE INVENTION

The object of the present invention is to provide an alignment device, which defines the relative position of the involved components to each other already during the pre-assembly, i.e., prior to screwing the components together.

This objective is solved by an alignment device as disclosed and claimed herein. The invention features an alignment device for attachment to a mounting support for vehicle front ends, whereby the alignment device is configured to receive a crash box that connects the mounting support to a bumper bracket. The alignment device includes a first abutment element and a second abutment element between which the crash box can be inserted and which are provided upon receiving the crash box to rest on opposite sides of the crash box. At least one abutment element is designed such that when receiving the crash box, it presses the same against the other abutment element, whereby one or more holding devices are provided on at least one of the first or second abutment elements that serve to limit the insertion of the crash box into the alignment device.

The alignment device according to the invention exhibits at least two abutment elements, between which the crash box can be inserted. The abutment elements are preferably spaced apart in the vertical direction Z of the vehicle and are provided to rest on opposite sides of the crash box—preferably in a vertical direction Z of the upper and lower side. One of the abutment elements, preferably the upper one, is designed such that when receiving the crash box, it presses the same against the other abutment element, preferably the lower one. Furthermore, a holding device is provided that limits the insertion of the crash box into the alignment device in the insertion direction X. In this manner, the crash box is defined by the upper abutment element when said crash box is inserted into the alignment device in the vertical direction Z, and by the second holding element in the insertion direction (i.e., against the direction of travel) X of the crash box.

Preferably, the alignment device is designed such that a crash box can be inserted from one side and a longitudinal beam of the vehicle can be inserted into and/or slid onto the alignment device from the other side. In this configuration, the alignment device is further designed such that if the crash box and the longitudinal beam of the vehicle are fully inserted and/or slid on, they engage with each other at least partially. This allows the parts mentioned to be secured to each other in one processing step by screwing them together.

It is particularly advantageous if the first abutment element comprises a tab that extends in the insertion direction of the crash box. In addition, it can be provided that this abutment element exhibits at least one section that extends at an angle to the insertion direction of the crash box. With an elastic design, this section ensures that a pre-tension is applied to the crash box that presses said crash box against the second abutment element, such that a defined position is achieved, preferably in the direction Z.

Preferably, it is further provided that the holding device has at least one stop for limiting the insertion depth of the crash box. This may be designed in a hook shape such that it encompasses a portion of the crash box in the stop position.

According to a particularly preferred embodiment, the holding device exhibits a latching element for interlocking with the crash box. Said latching element can be designed such that it snaps into a corresponding latching receptacle of the crash box when it reaches a defined position. The latching element and the latching receptacle of the crash box can be adjusted, for example by form-fitting, such that after interlocking, the possibility of movement of the crash box is eliminated in the transverse direction Y of the vehicle.

With an alignment device designed in this manner, a definition is possible in all three spatial directions X, Y, Z.

Furthermore, the alignment device is preferably designed to receive a longitudinal beam of the vehicle. It can include a positioning aid for this purpose.

To facilitate the insertion of the crash box, it can be provided in particular that one of the abutment elements, preferably the lower one, exhibits an abutment protrusion that protrudes counter to the insertion direction X of the crash box. The crash box can be supported by it, thus facilitating the pre-assembly.

The alignment device according to the invention is received by a mounting support of a vehicle front end. The alignment device can be connected to the side members of the mounting support, for example. Mounting supports can be pure plastic supports, for example, or sheet metal or die cast supports, to which the alignment device can be connected by screws or other fasteners or into which the alignment device can be integrated. For this purpose, the alignment device according to the invention can be provided as a separate component, however, it is also possible to manufacture the mounting support in a hybrid design, and to injection-mold the alignment device together with and into the mounting support or to connect it to the mounting support in some other manner during its manufacture.

A crash box is received by the alignment device. This is provided such that the crash box that is positioned in the alignment device in its respective end position and the longitudinal beam of the vehicle engage in each other at least partially. Here openings in the side member of the mounting support, in the crash box and in the longitudinal beam of the vehicle are aligned and can thus be screwed together by lateral insertion of a bolt. To this end, the side member is designed sufficiently flexible in the area in question such that seams or gaps are closed when screwed together with the longitudinal beam and the crash box, and the connection of the side member/mounting support, the crash box and the longitudinal beam will be without play and a defined and specified reference position for the crash box and the bumper bracket that are provided or to be provided thereon is established.

For better alignment, it is here also advantageously provided that the crash box exhibits a recess in the areas that face the abutment elements of the alignment device, said recess being adapted to said areas. In addition, the crash box preferably exhibits a latching recess that interacts with a latching element that is provided at the alignment device. With a complementary design or special coordinated design of the latching element and the latching recess, it can be achieved in particular that the location of the crash box is defined relative to the side member of the mounting support and perpendicular to the insertion direction when the latching element and the latching recess engage.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1A:
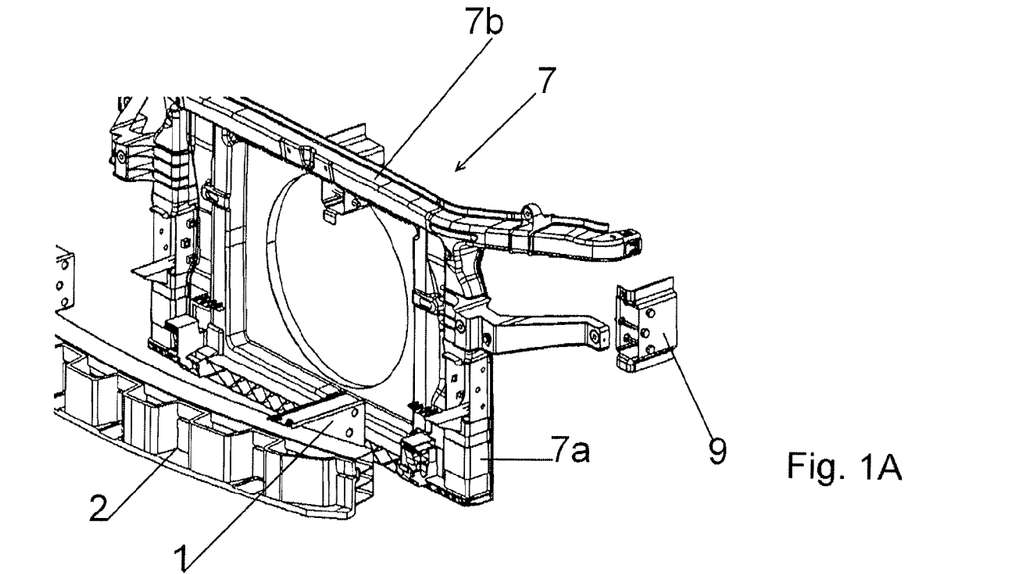
FIG. 1A shows an exploded view of a vehicle front end from a front perspective.
Figure 1B:
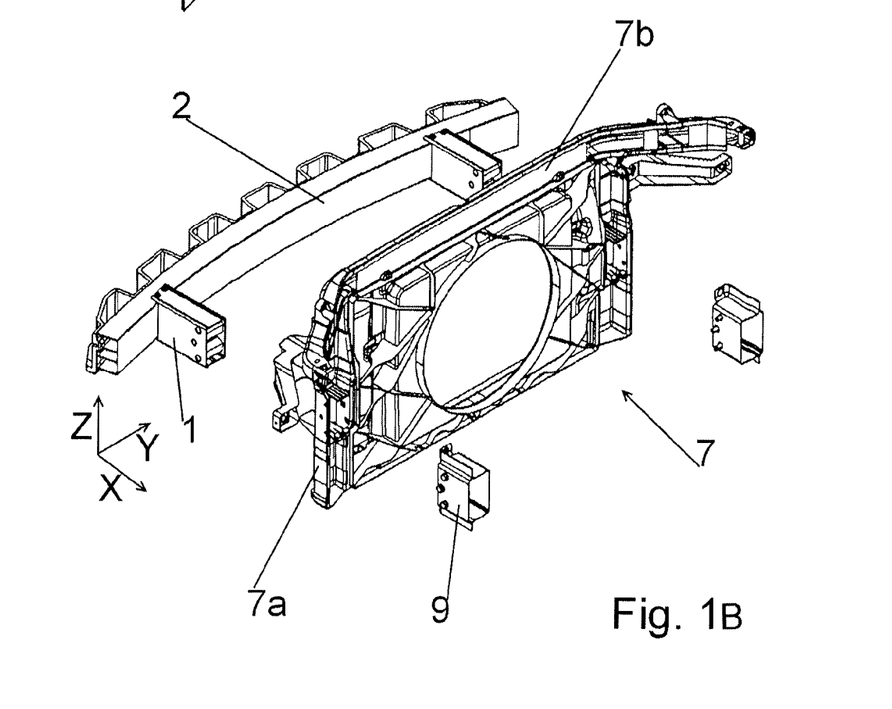
FIG. 1B shows an exploded view of a vehicle front end from a rear perspective.

The front end of a vehicle indicated in FIGS. 1A and 1B exhibits a mounting support 7, which exhibits a cross member 7b that extends essentially in the transverse direction Y of the vehicle and a longitudinal beam 7a that extends essentially in the vertical direction Z. The mounting support can be attached to the longitudinal beams of the vehicle indicated by item 9 and extending essentially in the direction of travel. A bumper bracket 2 is provided at the mounting support 7 and is attached to the mounting support 7 via crash boxes 1. In the shown generic version of the front-end, crash boxes 1, mounting supports 7 and longitudinal beams 9 are bolted together by bolts oriented in a transverse direction Y.

The alignment device according to the invention serves to define the individual components and in the shown example is provided in the area of at least one side member 7a.

Figure 2:
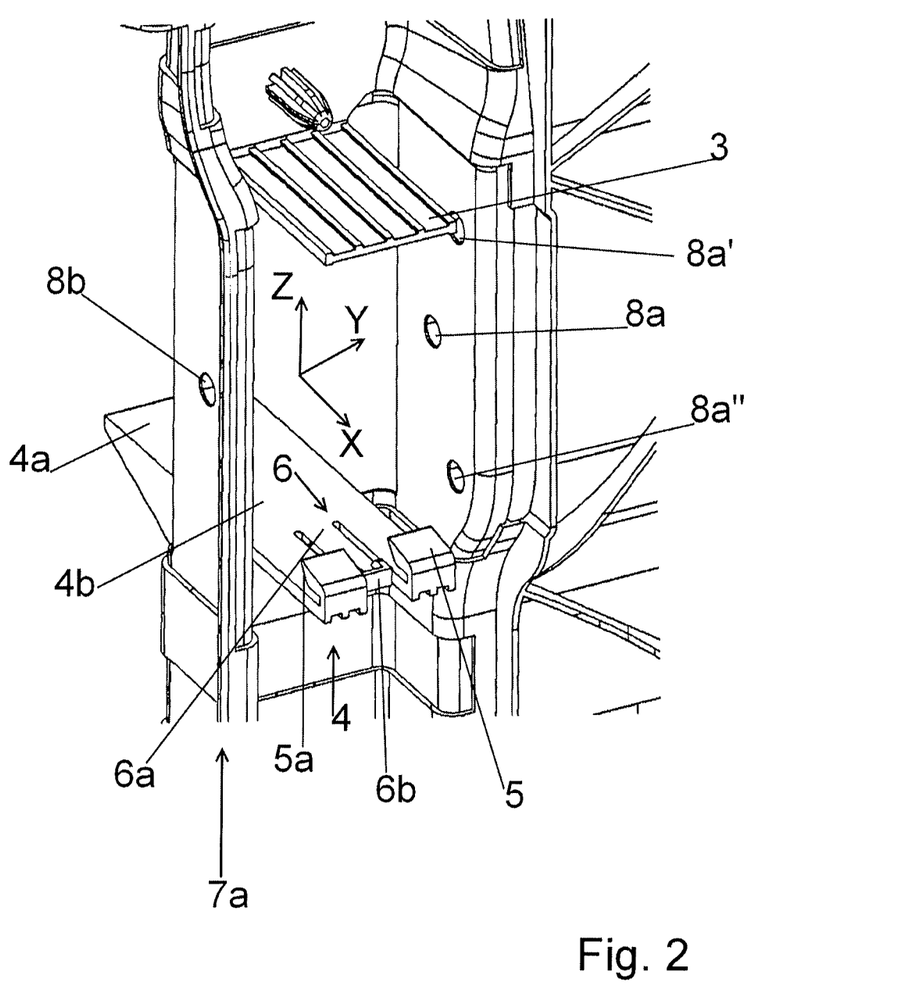
FIG. 2 shows a perspective view of the alignment device according to the invention.
Figure 2A:
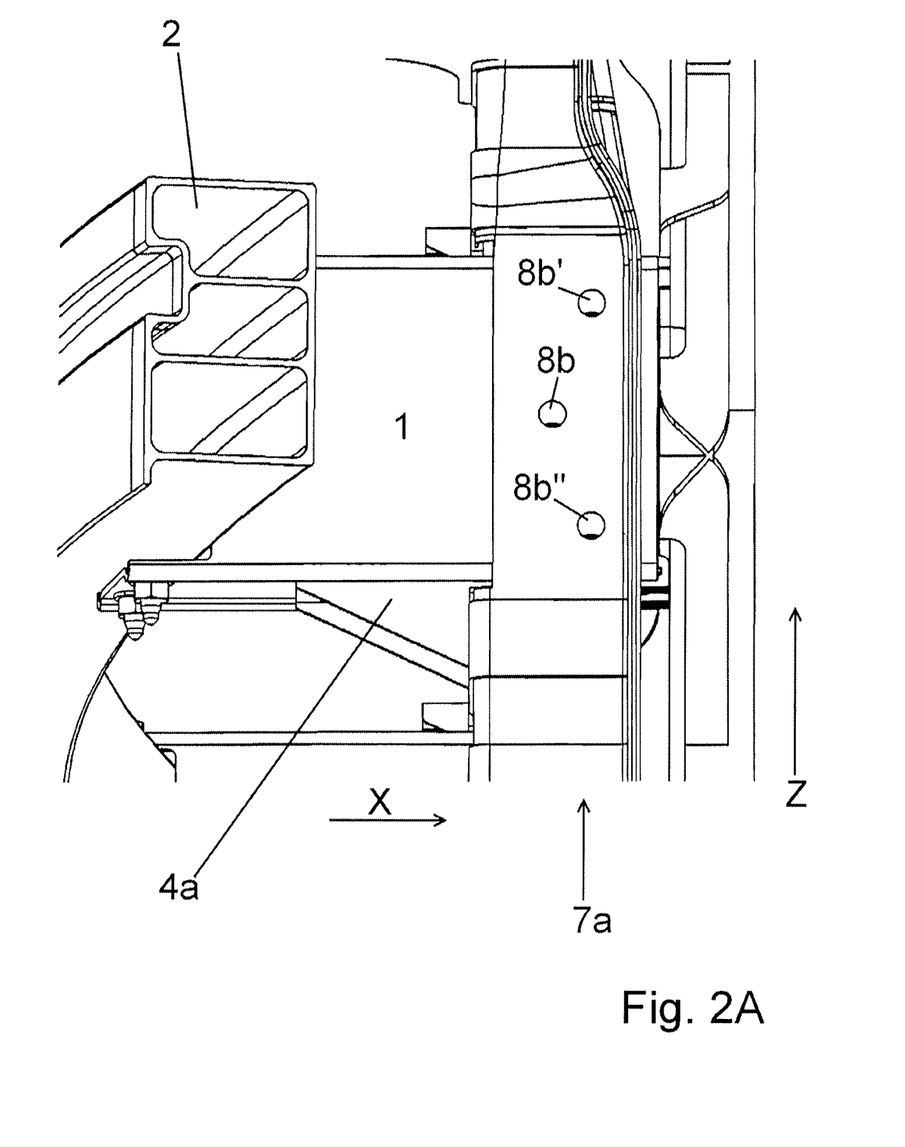
FIG. 2A shows a side view of the alignment device according to the invention.

FIGS. 2 and 2A show a more detailed representation of the alignment device. A section of the side member 7a of a mounting support in which the alignment device according to the invention is provided can be recognized. It exhibits a first abutment element 3, which extends in the form of a tab in the direction X of the insertion of the crash box (not shown in FIG. 2) and declines in the course of its longitudinal extension in the direction X slightly downward at an angle toward a second abutment element 4 or at an angle to the direction of insertion X. By inserting the crash box, this tab is pressed in the direction Z and applies a tension onto the crash box, which presses the latter against the second abutment element 4 and in this manner creates a defined position of the crash box relative to the mounting support in a vertical direction Z.

The holes 8a, 8a', 8a" and 8b in the side member 7a are used to receive bolts for subsequent screw connections.

In addition, the (lower) second abutment element 4 exhibits advantageously a support protrusion 4a for attaching or placing the crash box 1 thereon. It extends in the travel direction opposite to the insertion direction X of the first crash box 1. In the insertion direction X, the second abutment element 4 extends also in the insertion direction X and exhibits in continuation of the support protrusion 4a a support surface 4b in the area of the side member 7a. The second abutment element 4 continues to extend in the insertion direction X and ends with a holding device 5, 6, which is preferably designed together with the second abutment element 4 in one piece.

The holding device 5, 6 exhibits a stop 5 that limits the insertion of the crash box 1 in the direction X. This stop can be formed as shown by two preferably approximately hook-shaped stop elements 5. The hook shape is used to enclose and securely hook the crash box in the end region. To this end, the hooks can be designed such that they exert a clamping effect thereon upon insertion of the crash box 1. To this end, the hook ends that point towards the crash box exhibit preferably an angled surface 5a, in order to guide the inserted crash box 1 and to facilitate the clamping of the crash box 1. Thus, the crash box is secured against sliding in the direction of travel.

Furthermore, a latching element 6 is provided as part of the holding device, which in the shown example is arranged centrally between the hooks 5.

The latching element 6 is designed for engaging with a corresponding latching recess 1b of the crash box 1. This will be explained with reference to FIGS. 3 through 5. As seen in FIG. 2, the latching element 6 is designed as a tongue or tab 6a with a U-shaped protrusion 6b provided at its free end 6b extending in the direction Z towards the first holding element or the end position of the crash box 1, respectively. The protrusion 6b is preferably designed such that it forms a form closure or friction closure with the corresponding latching recess in the crash box 1, at least in the direction Y perpendicular to the direction of travel, such that the inserted crash box 1 is secured against movement in the direction Y in the area of the second holding element 4.

Figure 3:
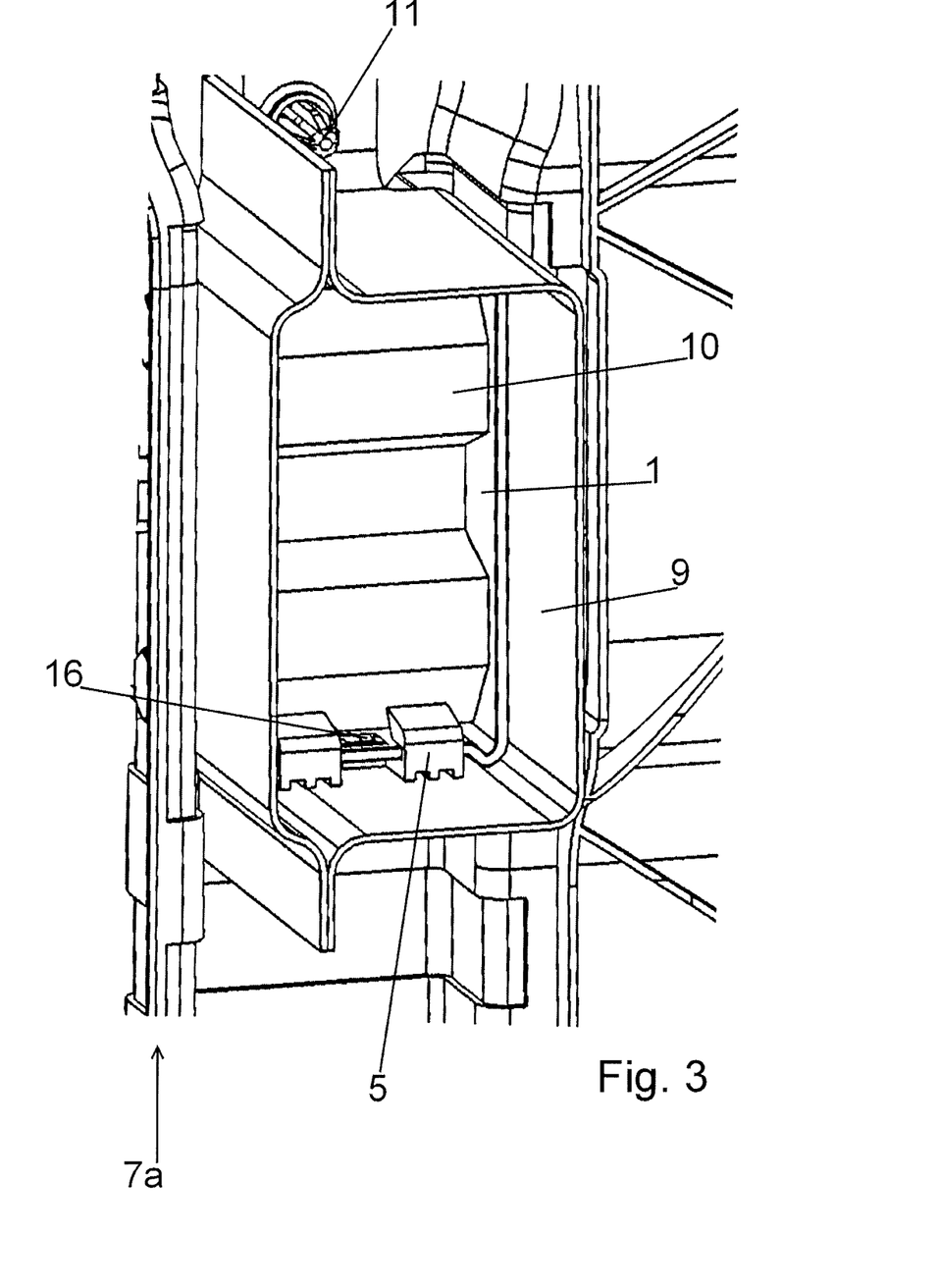
FIG. 3 shows a perspective view of the alignment device with a pre-mounted crash box and a longitudinal beam of the vehicle.

This situation is shown in FIG. 3. The crash box 1 abuts the hook 5, the latching element is dipped into the latching recess 1b of the crash box. From the opposite side, the longitudinal beam 9 is slid onto the crash box 1, whereby the alignment device exhibits one mandrel 11 that extends in the direction X and is preferably tapered and serves as a positioning aid for purposes of referencing in order to guide the mounting support 7 or the side member 7a better towards the longitudinal beam 9 and to facilitate the mounting onto the longitudinal beam 9. Finally, a stabilizing element 10 is provided in the crash box 1, in particular in order to prevent deformation of the crash box 1 in the direction Y during screw-fastening of the components.

Figure 4:
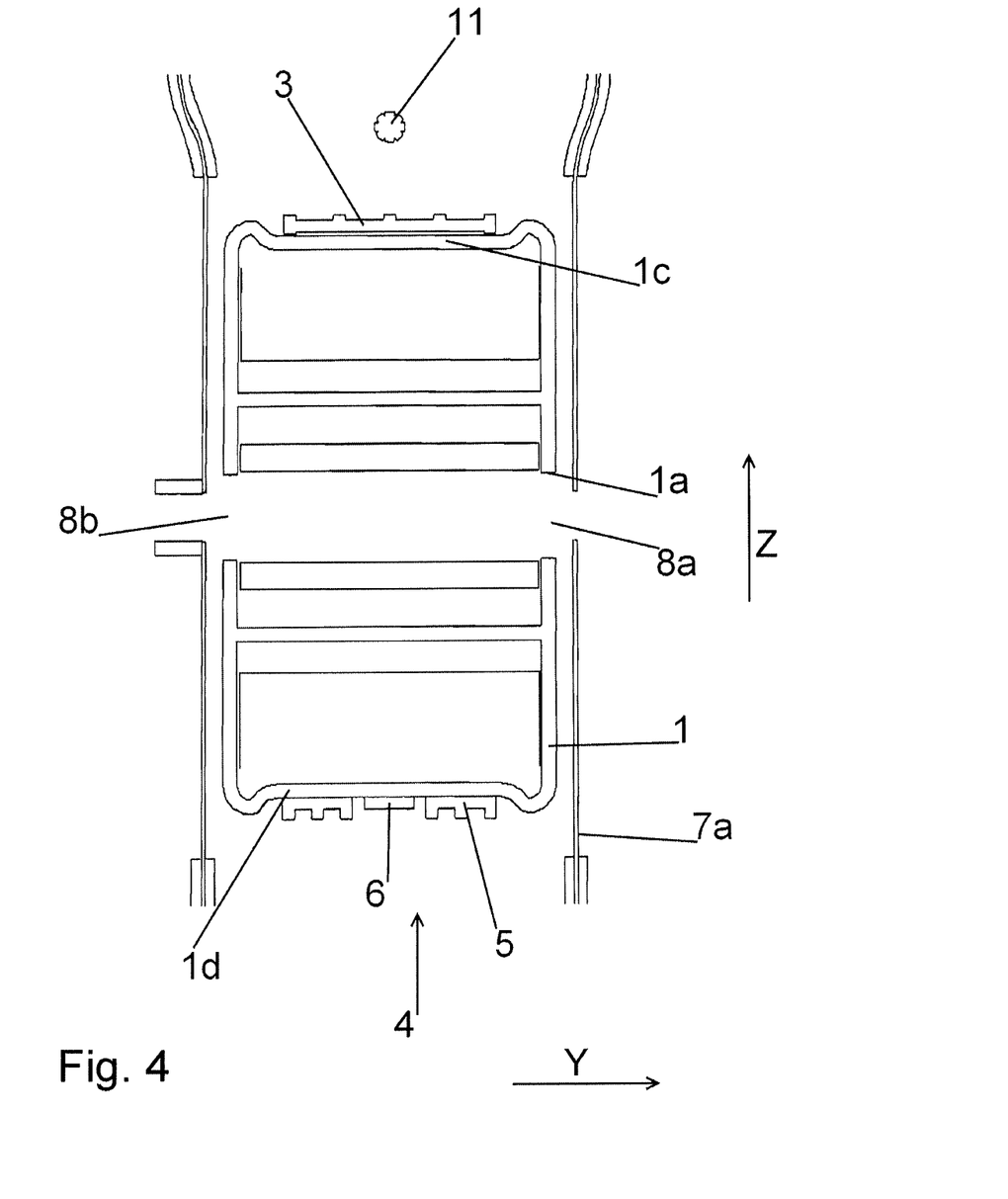
FIG. 4 shows a sectional view of the alignment device according to the invention with a pre-mounted crash box.

FIG. 4 shows in a section the situation after insertion of the crash box 1 into the alignment device according to the invention. At its upper side 1c and lower side 1d, the crash box 1 exhibits a depression or profile, which is designed such that the first holding element 3 or the second holding element 4, respectively, guides the crash box 1 when it is inserted into the alignment device. This facilitates the insertion of the crash box and ensures that it is centered during the insertion, such that the latching element 6 and the latching recess can engage in the crash box 1. In addition, the profiles at the crash box 1 can be designed such that a lateral (direction Y) play is largely avoided.

Figure 5:
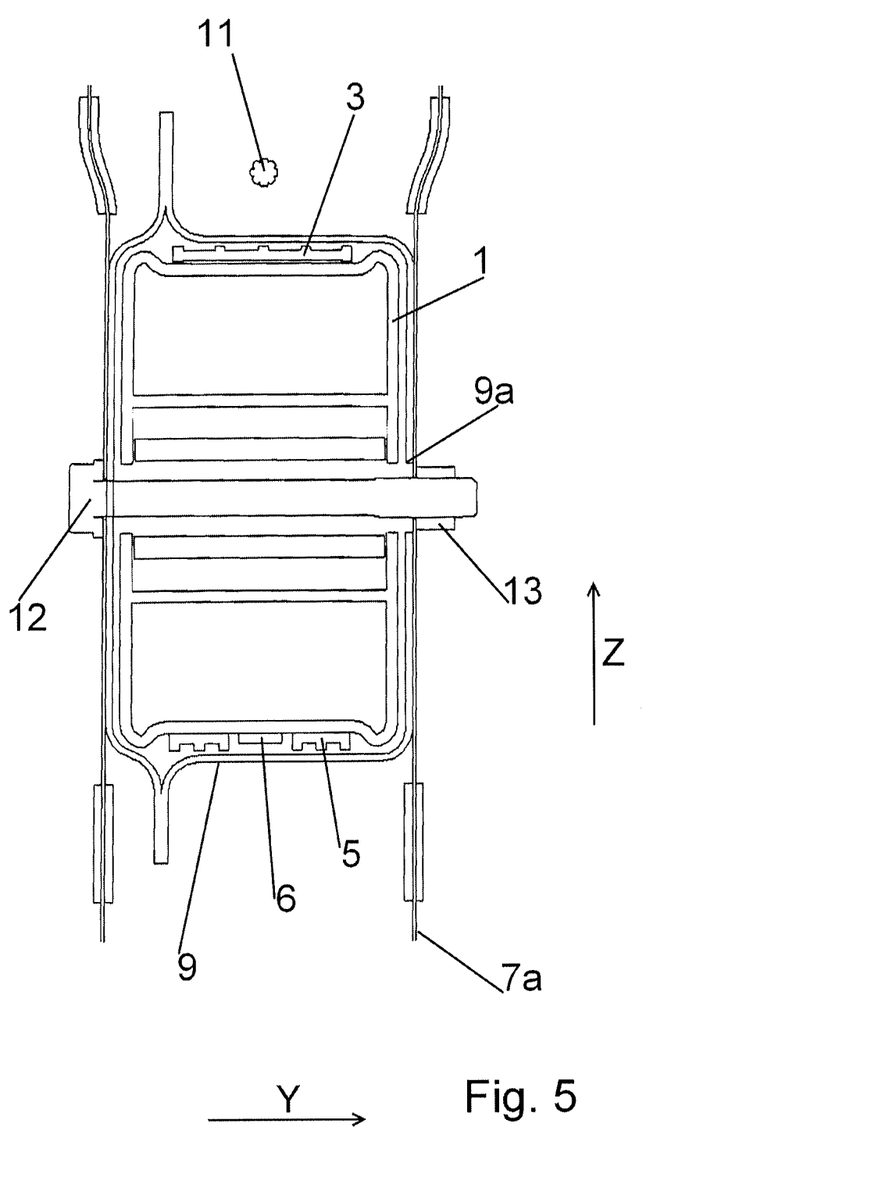
FIG. 5 shows a sectional view of the alignment device according to the invention for attaching the mounting support to the longitudinal beam of the vehicle and subsequent screwing together of the crash box, the mounting support and the longitudinal beam of the vehicle.
Figure 6:
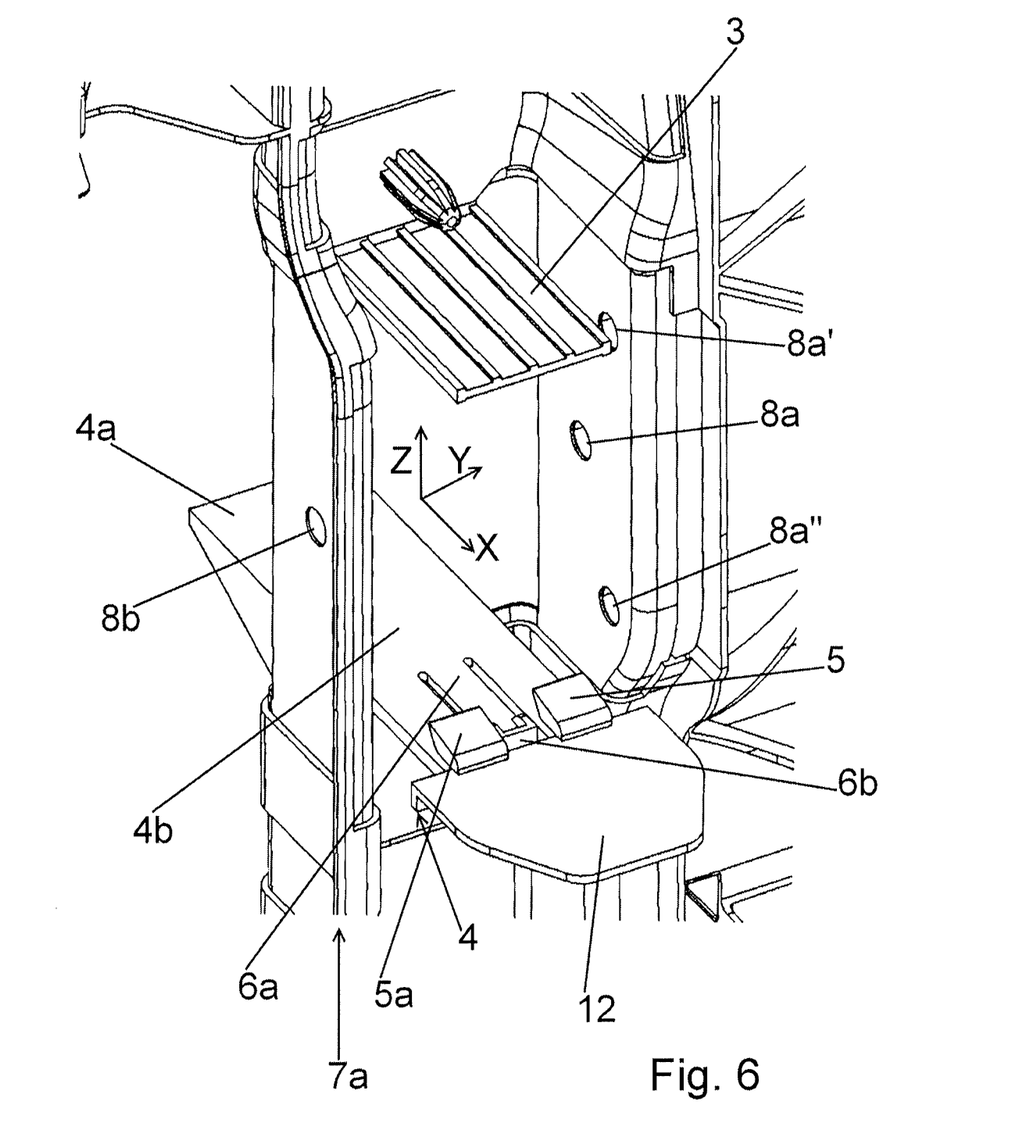
FIG. 6 shows a perspective view of an additional embodiment of the alignment device according to the invention.

As shown, the crash box 1 used in this manner still exhibits a distance to the side sections of the side member 7a that receives the crash box 1. In this interim space, the longitudinal beam 9 is received as shown in FIG. 5, whereby in the example shown, an interim space still remains between the longitudinal beam 9 and the crash box 1. In the condition shown in FIG. 5, the holes or openings of the side member 7a (e.g., 8a and 8b) align with corresponding openings in the crash box 1a and the longitudinal beam 9a. In the embodiment shown, there may be even more screw holes, however, with reference to FIG. 5, they are arranged in different sectional planes and therefore not shown.

Bolts 12 are inserted into the aligned holes and screw-fastened using a nut 13. Here, the wall material of the side member 7a is flexible in the screw connection area, such that it can yield when tightening the screw, and the spaces between the components 1, 9 and 7 can be eliminated.

Modifications and substitutions by one of ordinary skill in the art are considered to be within the scope of the present invention, which is not to be limited except by the allowed claims and their legal equivalents.

The invention claimed is:

1. An alignment device for attachment to a mounting support (7) for vehicle front ends, whereby the alignment device is configured to receive a crash box (1) that connects the mounting support (7) to a bumper bracket (2), whereby the alignment device includes a first abutment element (3) and a second abutment element (4), between which the crash box (1) can be inserted and wherein said first and second abutment elements (3,4) are configured to receive the crash box (1) between said first and second abutment elements (3,4) causing said first and second, abutment elements (3,4) to rest on opposite sides of the crash box (1), whereby said first abutment element (3) is designed such that when receiving the crash box (1), the first abutment element (3) presses the crash box (1) against the second abutment element (4), wherein said alignment device further includes a stationary holding device (5, 6) provided on at least one of the first or second abutment element (3,4), said holding device (5, 6) configured for limiting the insertion of the crash box (1) into the alignment device in an insertion direction (x).

2. An alignment device as set forth in claim 1, characterized in that the first abutment element (3) is configured as a tab that extends in said insertion direction (X) of the crash box (1).

3. An alignment device as set forth in claim 1, characterized in that the first abutment element (3) includes at least one section that is angled in relation to said insertion direction (X) of the crash box (1).

4. An alignment device as set forth in claim 1, characterized in that the stationary holding device (5, 6) includes at least one stop (5) that is configured to limit an insertion depth of the crash box (1) into the alignment device.

5. An alignment device as set forth in claim 4, characterized in that the at least one stop (5) is designed approximately hook-shaped such that the at least one stop (5) encompasses a portion of the crash box (1) in the stop position.

6. An alignment device as set forth in claim 1, characterized in that the stationary holding device (5, 6) includes a latching element (6) for engaging with the crash box (1).

7. An alignment device as set forth in claim 1, characterized in that the alignment device is further designed to receive a longitudinal beam (9) of the vehicle.

8. An alignment device as set forth in claim 7, characterized in that the alignment device includes a positioning aid (11) for the attachment at the longitudinal beam of the vehicle.

9. An alignment device as set forth in claim 7, characterized in that an insertion aid (12) for receipt in said longitudinal beam is provided that extends in a direction (Y) perpendicular to the insertion direction (X).

10. An alignment device as set forth in claim 9, characterized in that the insertion aid (12) exhibits a protrusion which is tapered.

11. An alignment device as set forth in claim 1, characterized in that the second abutment element (4) includes a support protrusion (4a) that protrudes parallel to the insertion direction (X) of the crash box (1).

12. An alignment device as set forth in claim 1, characterized in that the alignment device is designed such that a crash box (1) can be inserted from a first side of said alignment device and a longitudinal beam (9) of the vehicle can be inserted into and/or slid onto the alignment device from another parallel side, whereby the alignment device is designed further such that upon full or partial insertion of the crash box (1) and the longitudinal beam (9) of the vehicle into said alignment device, the crash box (1) and the longitudinal beam (9) engage with each other at least partially.

13. A vehicle front end with a mounting support (7) and one alignment device provided at the mounting support (7) as set forth in claim 1, whereby the alignment device is connected to the mounting support (7) and a crash box (1) is received by the alignment device.

14. A vehicle front end as set forth in claim 13, characterized in that the alignment device is connected to a side member (7a) of the mounting support (7), and wherein said mounting support is coupled to said vehicle front end.

15. A vehicle front end as set forth in claim 13, characterized in that the crash box (1) which is positioned in an end position in the alignment device and a longitudinal beam (9) of the vehicle engage with each other at least partially, whereby openings (8a, 1a, 9a) are provided in the side member (7a) of the mounting support, as well as in the crash box (1) and in the longitudinal beam (9) of the vehicle, and wherein said openings are in alignment when said longitudinal beam (9) and said crash box (1) are positioned in said end position in said alignment device.

16. A vehicle front end as set forth in claim 13, characterized in that the crash box (1) exhibits a recess in crash box surface areas that face the abutment elements (3, 4) of the alignment device, wherein said recess are adapted to receive said abutment elements (3,4).

17. A vehicle front end as set forth in claim 13, characterized in that the crash box (1) includes a latching recess (1d) that interacts with a latching element (6) provided on the alignment device.

18. A vehicle front end as set forth in claim 17, characterized in that that the latching recess (1d) and the latching element (6) are coordinated such that the location of the crash box (1) is defined when the latching element (6) and the latching recess (1d) are positioned relative to the side member (7a) of the mounting support (7) perpendicular to the insertion direction (X).

\* \* \* \* \*